(12) United States Patent
Raju

(10) Patent No.: US 9,996,782 B2
(45) Date of Patent: Jun. 12, 2018

(54) SYSTEM FOR AND METHOD OF COMMUNICATING BARCODE INFORMATION USING A MOBILE DEVICE

(71) Applicant: Samsung Pay, Inc., Burlington, MA (US)

(72) Inventor: Venkatesh Raju, San Jose, CA (US)

(73) Assignee: SAMSUNG PAY, INC., Burlington, MA (US)

( * ) Notice: Subject to any disclaimer, the term of this patent is extended or adjusted under 35 U.S.C. 154(b) by 0 days. days.

(21) Appl. No.: 15/335,357

(22) Filed: Oct. 26, 2016

(65) Prior Publication Data

US 2017/0124444 A1 May 4, 2017

Related U.S. Application Data

(60) Provisional application No. 62/248,631, filed on Oct. 30, 2015.

(51) Int. Cl.
| | |
|---|---|
| *G06F 17/00* | (2006.01) |
| *G06K 19/06* | (2006.01) |
| *G06K 7/10* | (2006.01) |
| *G06K 7/14* | (2006.01) |
| *G06F 3/12* | (2006.01) |
| *H04W 88/02* | (2009.01) |

(52) U.S. Cl.
CPC ...... *G06K 19/06112* (2013.01); *G06F 3/1203* (2013.01); *G06F 3/1276* (2013.01); *G06F 3/1292* (2013.01); *G06K 7/1095* (2013.01); *G06K 7/1413* (2013.01); *G06K 7/1447* (2013.01); *G06K 19/06028* (2013.01); *H04W 88/02* (2013.01)

(58) Field of Classification Search
CPC .......... G06K 19/06112; G06K 7/1095; G06K 7/1413; G06K 7/1447; G06K 19/06028; G06F 3/1203; G06F 3/1276; G06F 3/1292; H04W 88/02
USPC .... 235/375, 462.45, 462.46, 472.01, 472.02, 235/472.03
See application file for complete search history.

(56) References Cited

U.S. PATENT DOCUMENTS

| | | | |
|---|---|---|---|
| 2004/0232241 A1 * | 11/2004 | Challa ................ | G06K 7/1095 235/462.46 |
| 2010/0145789 A1 | 6/2010 | Upadhya et al. | |
| 2013/0256422 A1 | 10/2013 | Osborne et al. | |
| 2014/0058823 A1 | 2/2014 | Ross et al. | |
| 2015/0186765 A1 | 7/2015 | Osborne | |

OTHER PUBLICATIONS

International Search Report dated Jan. 3, 2017, Applicant: Mobeam, Inc., 11 pages.

* cited by examiner

*Primary Examiner* — Karl D Frech
(74) *Attorney, Agent, or Firm* — Seyfarth Shaw LLP; Brian Michaelis

(57) ABSTRACT

A system for and a method of communicating barcode information using a mobile device. A method comprises steps of: invoking an application print feature using a first software application of the mobile device, the first software application being print-capable; extracting one or more barcodes from the print content using a second software application; and transmitting an extracted barcode from the mobile device as pulsed light using light-emitting hardware of the mobile device.

20 Claims, 5 Drawing Sheets

SYSTEM FOR AND METHOD OF COMMUNICATING BARCODE INFORMATION USING A MOBILE DEVICE

This application claims the benefit of U.S. Provisional Application No. 62/248,631, filed Oct. 30, 2015, the entire contents of which are hereby incorporated by reference herein.

BACKGROUND OF THE INVENTION

The present invention relates to the field of encoding and communicating barcode information.

A barcode is a machine-readable representation of data. Barcodes are typically printed on items, such as paper labels or packaging for goods, manufacturer's or retailer's coupons, or on tickets or passes such as airline boarding passes. Barcode scanners (also referred to as barcode readers) are used to extract information from barcodes. Barcode scanners are found in many different types of facilities including stores and supermarkets, airport security check-in and boarding areas, stadiums, libraries, test centers, conference centers, and in many other contexts. The use of barcode scanners has dramatically increased the speed and convenience of performing many commonplace transactions.

While typically printed on paper or other objects, barcodes may also be presented on the electronic displays of personal electronic devices such that the barcode can be read by a barcode scanner. While it can be useful to present coupons and other information in barcode form on the display screen of a personal electronic device, there are disadvantages. Some barcode scanners, for example, cannot reliably read barcodes displayed on certain types of displays because the contrast ratio between the bars and spaces shown on the display screen, which typically is a liquid crystal display ("LCD"), is not sufficient. Further, the physical dimensions and/or resolution of the display screen may also limit the size of the barcode that may be displayed at one time.

A technology that simulates barcodes using pulsed light and thereby overcomes various limitations of static screen-displayed barcodes is disclosed in, for example, U.S. Pat. No. 6,685,093 issued Feb. 3, 2004 to Challa et al. What is needed are improved techniques for communicating barcode information using a mobile device.

SUMMARY OF THE INVENTION

The present invention provides a system for and a method of communicating barcode information using a mobile device. In an embodiment, a method comprises steps of: invoking an application print feature using a first software application of the mobile device, the first software application being print-capable; extracting one or more barcodes from the print content using a second software application; and transmitting an extracted barcode from the mobile device as pulsed light using light-emitting hardware of the mobile device.

BRIEF DESCRIPTION OF THE DRAWINGS

The present invention is described with respect to particular exemplary embodiments thereof and reference is accordingly made to the drawings in which.

DETAILED DESCRIPTION OF A PREFERRED EMBODIMENT OF THE INVENTION

Figure 1:
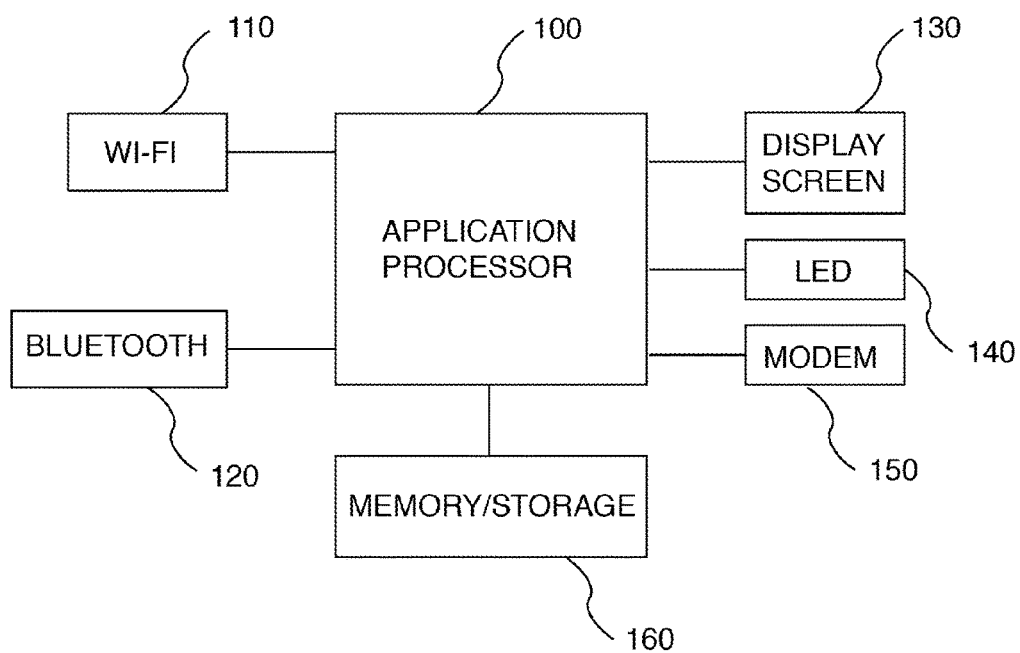
FIG. 1 illustrates a hardware diagram of a mobile device in accordance with an embodiment of the present invention.

Technology that simulates barcodes using pulsed light (also referred to herein as a "light-simulated barcode" or more simply "beaming") is disclosed in, for example, U.S. Pat. No. 6,685,093, U.S. Pat. No. 7,028,906 and U.S. Pat. No. 7,967,211, the entire contents of all of which are hereby incorporated by reference. In accordance with this light-simulated barcode technology, barcodes are transmitted using pulses of light that mimic the reflections caused by a printed barcode when scanned by a laser barcode scanner. This technology is typically implemented by a combination of hardware and software on one or more components of a mobile communication device. In order to utilize the implementation, a software application that utilizes barcodes, which can be a third-party application, must generally integrate with the beaming implementation via software application program interface (APIs). However this requires modification to the third party application and the use of the beaming technology is, therefore, limited to applications that integrate with the beaming implementation.

A software development kit (SDK) can be used to enable third party application developers to integrate the beaming implementation into their own applications. However, this still requires the application developer to integrate with the SDK which requires some effort to implement.

In accordance with an embodiment of the present invention, the need for the SDK is eliminated. Instead, a mobile device can be used to generate a light-simulated barcode where the barcode is originated by any device application (e.g. a third-party mobile device application), even if the application has not directly integrated with the light-simulated barcode beaming implementation.

Thus, the present invention provides a virtual printer (driver) that does not print content to paper but rather examines the content to be printed and extracts barcodes that the user can then select and beam using light-simulated barcode technology.

In accordance with an embodiment of the present invention, a system for generating a light simulated barcode is provided that presents itself to an operating system as a printer, thereby allowing any device application with a print feature to access the system. The system accepts content from the device application as data to be printed and examines the content in order to detect the presence of one or more barcodes. The system preferably notifies the user of all barcodes discovered in the content and provides an interface for the user to select and immediately generate a light-simulated barcode for any of the discovered barcodes immediately, or to save the discovered barcode(s) for later transmission. The light-simulated barcode is generated by emitting pulsed light from any light-emitting hardware included within or connected to the mobile device, such as a display screen, a display screen backlight, or light-emitting diode (LED).

Examination of the content accepted from the device application as described herein can be performed on the mobile device, or on an external application server, e.g. on the Internet cloud, or both.

In accordance with an embodiment of the present invention, the need for a device application to integrate with the beaming implementation is eliminated. All that is required is for the application to provide a printing feature using the operating system's printing framework. Applications such as an email client, web browser and picture gallery typically offer a print feature, so any barcoded content received via email or the web can be setup for beaming in accordance with the present invention. Examples include coupons, tickets, gift cards, payment vouchers, etc. that users receive via email or web links.

FIG. 1 illustrates a hardware diagram of a mobile device in accordance with an embodiment of the present invention. As shown in FIG. 1, the mobile device can include an application processor (100), a Wi-Fi transceiver (110), a Bluetooth transceiver (120), a display screen (130), a light emitting diode (LED) 140 that can emit a light-simulated barcode as described herein, a modem (150) and memory/storage (160). Software applications as described herein can be stored in memory/storage of the mobile device and executed by the application processor of the mobile device. Light-simulated barcodes can be generated as described herein by the mobile device's display screen or LED. It will be apparent that the mobile device shown in FIG. 1 is exemplary and that different mobile device configurations can be employed in connection with the present invention.

Figure 2:
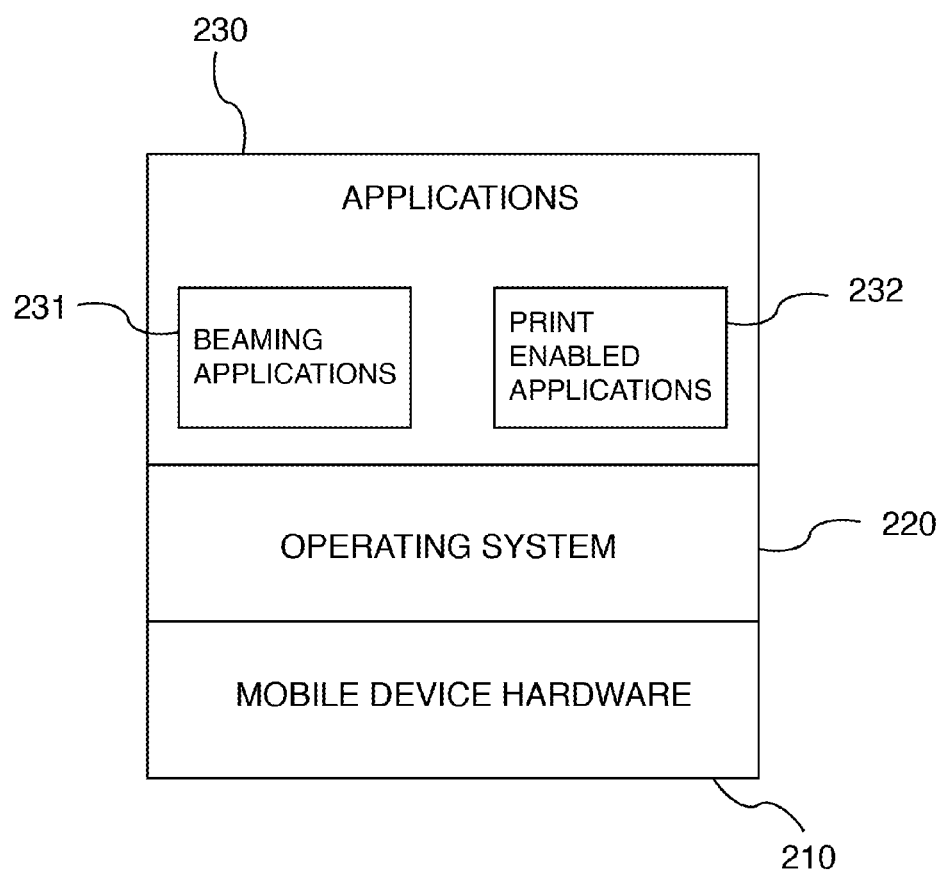
FIG. 2 illustrates a hardware and software system architecture for a mobile device in accordance with an embodiment of the present invention.

FIG. 2 illustrates a hardware and software system architecture for a mobile device in accordance with an embodiment of the present invention. As shown in FIG. 2, the system architecture can include the mobile device hardware (210), an operating system (220) and application programs (230). The operating system (220) functions as an interface between the hardware (210) and application programs (230). A print capable application (232), which can be a third-party application, can originate content including a barcode. The print capable application (232) can be, for example, an email application, web browser or other application. The print capable application (232) can then transfer the content to the beaming application (231) by accessing a virtual print driver and then invoking a print feature of the print-capable application (232). The virtual print driver can be included in the beaming application (231). The beaming application (231) can then examine the content to be printed and extract barcodes that the user can then select using the beaming application (231). The beaming application (231) can then beam the selected barcodes using light-simulated barcode technology using the mobile device hardware to generate the pulsed light signals.

Figure 3:
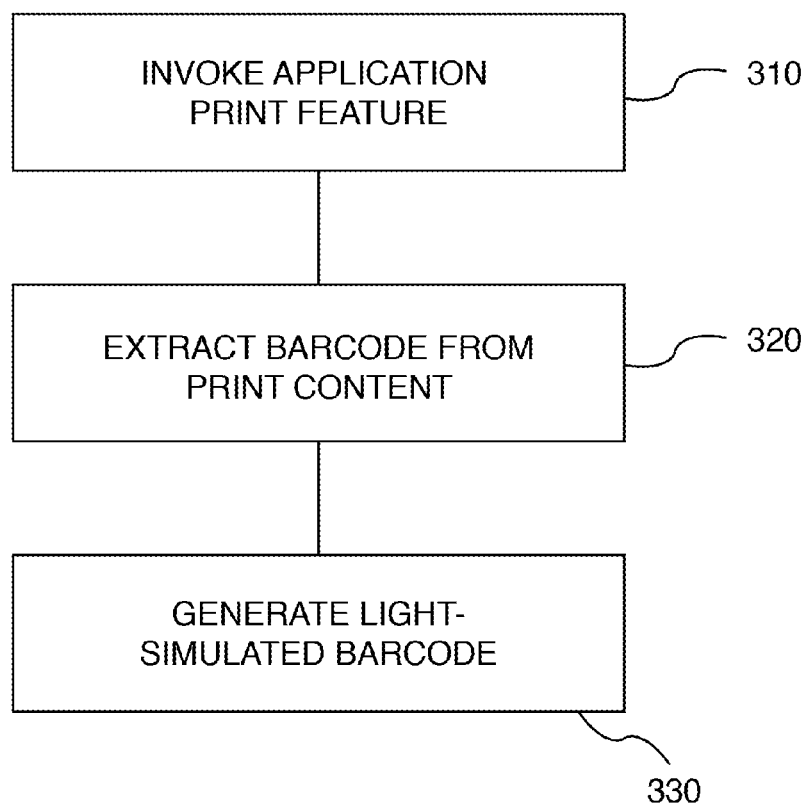
FIG. 3 illustrates a flow diagram of a method of communicating barcode information in accordance with an embodiment of the present invention.

FIG. 3 illustrates a flow diagram of a method of communicating barcode information in accordance with an embodiment of the present invention. As shown in FIG. 3, in a first step (310), an application print feature is invoked. This step can be performed by the user accessing a print feature of a print-capable software application. Then, in a next step (320), one or more barcodes are extracted from the printed content. This step can be performed by the beaming application. Then, in a next step (330), a selected barcode can be transmitted as pulsed light. This step can be performed by the application processor and display hardware of the mobile device, as described herein.

The print feature can be invoked in the print-capable or third party application as follows. Applications that support printing typically include a menu item to invoke printing. The menu item may be at the top level of the application's menu tree, or a sub-item. The application may use the word "print" as the menu item, or display a representative icon shown in the figure below, or both. Clicking on this menu item typically causes the operating system to display a printing dialog, which allows the user to specify the pages to be printed, number of copies, color vs. black-and-white, paper size, and other attributes.

It is also possible for the content itself to include the user interface required to print. For example, HTML content rendered in a web browser or HTML display element within an application, can display an image or text hyperlink which when clicked invokes the well-known Javascript window.print( ) API. This causes the operating system to display its standard printing dialog.

The printing dialog generally includes a preview of the printed content so the user can see how the content would look on paper. The printing dialog also has a user interface element such as a button or text that allows the user to finalize the request and submit the print job.

The application can generate the printed content as follows. When the user submits the print job, typically from the print dialog, the operating system's printing framework requests the application to render the content for printing. The application can render the content in a number of ways, for example it may generate a raster image (or bitmap), a vector image, or a platform and application-independent document format such as Adobe® PostScript or Adobe® Portable Document Format (PDF). Modern smartphone platforms can use Adobe PDF as the format for applications to generate the printable content. Therefore when a user prints content from within a mobile application, it generates a document in the Adobe PDF format which is then processed by the printer driver to deliver to the printer.

Barcodes can be extracted from the printed content as follows. The printed content generated by the third party application can be either a vector or raster image, or a platform and application-neutral document format such as PostScript or PDF. If the printed content is in an image format, it can be analyzed for the presence of a barcode, and algorithms applied to decode the barcode. There are well known methods for performing this including an open source software implementations such as Zebra Crossing ("zxing"). Vector images may require to be converted to a raster image depending upon the technique employed.

If the printed content is in a document format such as PostScript or PDF, each page of the document can first be converted into a raster image and the image then decoded as described above. Depending upon the technique used by the third party application to generate the printed document, the document may contain encoded images from the original source content that can be extracted from the document. If this is the case it will be advantageous to extract these images and run the decoding algorithm described above on the individual images instead of converting the entire page into an image. Methods to convert PostScript and PDF document pages to images as well as extracting embedded images from such documents are well known. There are also open source software implementations such as PDFBox that can be employed.

Figure 4:
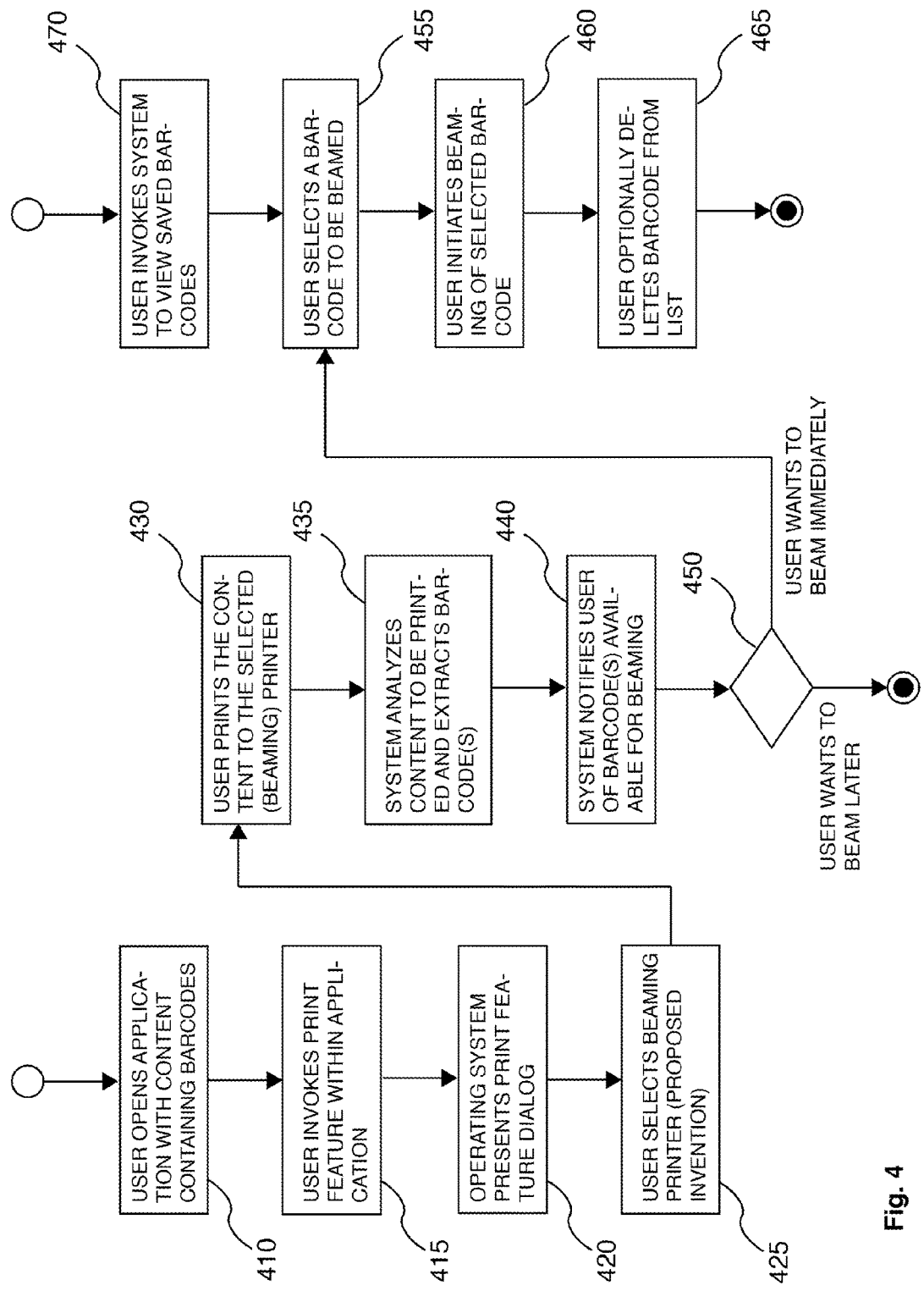
FIG. 4 illustrates a flow diagram of a method of communicating barcode information in accordance with an alternative embodiment of the present invention.
Figure 5A:
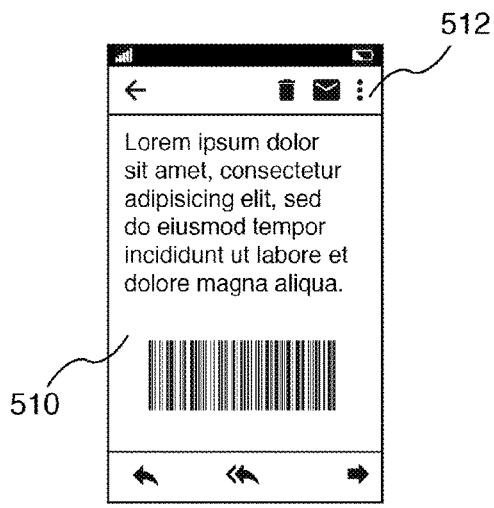
FIGS. 5(a)-(d) illustrate mobile device screenshots showing a user interface in accordance with an embodiment of the present invention.
Figure 5B:
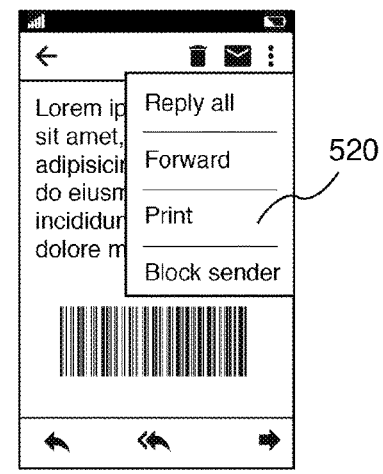
Figure 5C:
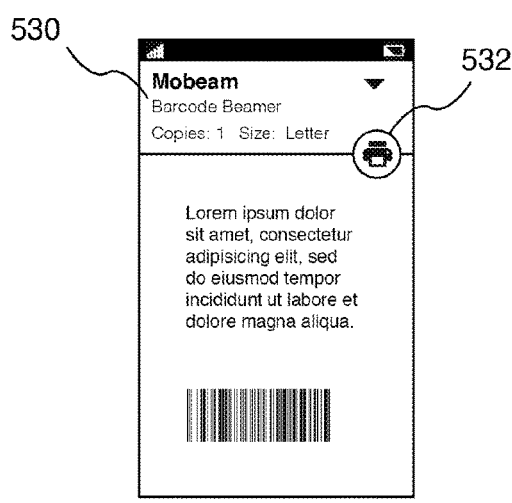
Figure 5D:
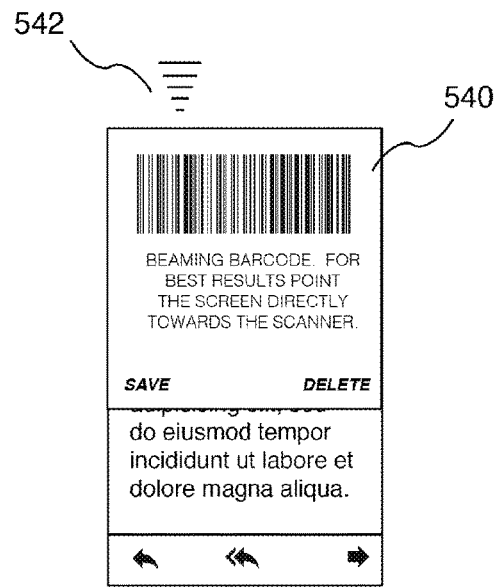

FIG. 4 illustrates a more detailed flow diagram of a method of communicating barcode information in accordance with an alternative embodiment of the present invention. In the first step (410) the user opens an application.

Note that the application's content may not always include barcodes but the situations where barcodes are not present is not relevant to this invention. If the application content contains one or more barcodes the user may wish to transmit one or more of them to a point-of-sale scanner immediately, or perhaps prepare them for transmission at a later time. To achieve this the user invokes the application's print feature as depicted in the next step (415). The operating system then displays a familiar print feature dialog that typically shows the available list of printers (420). The dialog may indicate the default printer that is automatically chosen if the user does not explicitly make a selection. In the next step (425) the user selects the printer corresponding to this invention if it is not already the default printer. In this step the user may also perform additional print feature customizations as necessary. In the next step (430) the user submits the print job, typically by clicking a confirmation button on the print dialog. In a subsequent step (435) the system searches the printed content for barcodes and extracts them as described previously. This step may be performed entirely on the device, or in combination with a remote server-based component. In the next step (440) the system notifies the user that the one or more extracted barcodes are ready for beaming. The system also saves the extracted barcodes for future use or to prevent loss due to a device crash. The user then decides if he/she wants to beam the barcode(s) immediately or at a later time (450). For example, if the user is already at a store or venue and the barcode represents a coupon or ticket, the user will want to beam the barcode right away. However, if the user is browsing the application at home, then he/she may simply want to have the barcode(s) saved for later use. If the user selects to beam the barcode(s) immediately, the user selects a barcode (455) and then initiates beaming (460). Note that these steps may be combined in that selecting the barcode can also initiate beaming of that barcode. Furthermore, if only one barcode was detected, e.g., in step (435), the mere action of responding to the notification can initiate beaming of the barcode, by for example, clicking on the notification in step (450). Finally, if the barcode represents a one-time use item, the user can remove the barcode from the system (465). FIG. 4 also shows the flow for the case when the user wishes to beam a previously saved barcode. In this case the user invokes the system (470) and is presented with a list of all previously saved barcodes. Invoking the system may be done via the operating system's printer management utility and selecting the beaming printer, or a custom application that directly manages the beaming printer.

FIGS. 5(*a*)-(*d*) illustrate mobile device screenshots showing a user interface in accordance with an alternate embodiment of the present invention. This embodiment generally follows the flow described in the embodiment of FIG. 4 but with steps 440-460 combined into a single step so that the first extracted barcode is beamed automatically as soon as the decoding of step 440 has been completed. Thus, in accordance with this embodiment, if only a single barcode is extracted, it can be immediately beamed without further interaction by the user. If multiple barcodes are extracted, at least the first one extracted can be immediately beamed without further interaction by the user. The extracted barcodes can additionally be made available for beaming upon selection by the user. FIG. 5(*a*) shows the screenshot of an email application on Android displaying an e-mail message containing a barcode (510). To invoke the print-to-beam feature the user first taps on the menu icon (512). This action causes the menu to be displayed as shown in FIG. 5(*b*). The user then taps on the "print" action (520) causing the print feature dialog to be displayed as shown in FIG. 5(*c*). At this point the user selects the print-to-beam printer if not already chosen as the printer (530). The user then taps on the print confirmation button (532). The system then decodes the printed content, extracts the barcodes, and starts beaming the first barcode (542) as shown in FIG. 5(*d*). The barcode is also displayed (540) for compatibility with image-based scanners. The barcode display also provides button to delete the barcode from the system or save for future use.

The foregoing detailed description of the present invention is provided for the purposes of illustration and is not intended to be exhaustive or to limit the invention to the embodiments disclosed. Accordingly, the scope of the present invention is defined by the appended claims.

What is claimed is:

1. A method of communicating barcode information using a mobile device, comprising steps of:
   providing, by an operating system of the mobile device, a printing framework via which print-capable applications on the mobile device access printers;
   accessing, by a first software application of the mobile device, a virtual printer driver through the printing framework, the first software application being print-capable and the virtual printer driver being presented by the printing framework to the first software application as a printer;
   invoking an application print feature of the first software application to print content to the virtual printer driver;
   extracting, by the virtual printer driver, one or more barcodes from the content received by the virtual printer driver from the first software application; and
   transmitting a barcode extracted by the virtual printer driver from the mobile device as pulsed light using light-emitting hardware of the mobile device.

2. The method according to claim 1, wherein the step of transmitting is performed for at least a first one of the one or more extracted barcodes automatically upon being extracted in accordance with said step of extracting.

3. The method according to claim 1, wherein said step of transmitting is performed upon a user selection of a barcode from among the one or more extracted barcodes.

4. The method according to claim 3, wherein said step of extracting extracts a plurality of barcodes.

5. The method according to claim 3, further comprising providing a notification to the user once the one or more barcodes are extracted.

6. The method according to claim 5, wherein the user performs said invoking of the print feature.

7. The method according to claim 1, wherein said step of extracting comprises examining the content generated by the first application.

8. The method according to claim 7, wherein the first application comprises one or more of an email application, a web-browser, or a picture gallery.

9. The method according to claim 7, wherein said examining is performed entirely on the mobile device.

10. The method according to claim 7, wherein said examining is performed on the mobile device in combination with a server-based component on an external application server.

11. A system for communicating barcode information, the system comprising a mobile device having:
    light-emitting hardware;
    an operating system including a printing framework via which print-capable applications on the mobile device access printers;

a virtual printer driver accessed by the print-capable applications through the printing framework, the virtual printer driver being presented by the printing framework to the print-capable applications as a printer;

a first software application, the first software application being print-capable, wherein upon accessing the virtual printer driver, and invoking a print feature of the first software application to print content to the virtual print driver, the first software applications generates the content, and wherein the virtual printer driver extracts one or more barcodes from the content received from the first software application, and wherein the mobile device is configured to transmit a barcode extracted by the virtual printer driver as pulsed light using the light-emitting hardware of the mobile device.

12. The system according to claim 11, wherein the mobile device is configured to transmit at least a first one of the extracted one or more extracted barcodes automatically upon extraction.

13. The system according to claim 11, wherein the mobile device is configured to transmit upon a user selection of a barcode from among the one or more extracted barcodes.

14. The system according to claim 13, wherein a plurality of barcodes are extracted.

15. The system according to claim 13, wherein the system provides a notification to the user once the one or more barcodes are extracted.

16. The system according to claim 15, wherein the user performs said invoking of the print feature.

17. The system according to claim 11, wherein extraction of the one or more barcodes comprises examination of the content generated by the first application.

18. The system according to claim 17, wherein the first application comprises one or more of an email application, a web-browser or a picture gallery.

19. The system according to claim 17, wherein said examination is performed entirely on the mobile device.

20. The system according to claim 17, wherein said examination is performed on the mobile device in combination with a server-based component on an external application server.

* * * * *